(12) United States Patent
Duggan et al.

(10) Patent No.: US 8,074,890 B2
(45) Date of Patent: Dec. 13, 2011

(54) WEARABLE DATA TRANSCEIVER WITH COUPLED ANTENNA

(75) Inventors: Robert J Duggan, Strafford, NH (US); Spencer L Webb, Pelham, NH (US)

(73) Assignee: Consortium P, Inc., Rochester, NH (US)

( * ) Notice: Subject to any disclaimer, the term of this patent is extended or adjusted under 35 U.S.C. 154(b) by 0 days.

(21) Appl. No.: 12/554,446

(22) Filed: Sep. 4, 2009

(65) Prior Publication Data
US 2011/0057042 A1    Mar. 10, 2011

(51) Int. Cl.
G06K 19/00 (2006.01)
G06K 19/06 (2006.01)
H01L 35/00 (2006.01)

(52) U.S. Cl. ............ 235/492; 235/487; 343/700 R

(58) Field of Classification Search ............ 235/487, 235/492; 343/700 R
See application file for complete search history.

(56) References Cited

U.S. PATENT DOCUMENTS

| | | | |
|---|---|---|---|
| 5,678,202 A | 10/1997 | Filimon et al. | |
| 5,973,598 A | 10/1999 | Beigel | |
| 6,346,886 B1 | 2/2002 | De La Huerga | |
| 6,411,213 B1 * | 6/2002 | Vega et al. | 340/573.3 |
| 6,888,502 B2 | 5/2005 | Beigel et al. | |
| 7,198,190 B2 * | 4/2007 | Juhan et al. | 235/380 |
| 7,230,539 B2 * | 6/2007 | Klein | 340/573.3 |
| 7,551,141 B1 * | 6/2009 | Hadley et al. | 343/700 MS |
| 2002/0087436 A1 * | 7/2002 | Guthrie et al. | 705/28 |
| 2005/0096513 A1 | 5/2005 | Ozguz et al. | |
| 2005/0168340 A1 | 8/2005 | Mosher, Jr. et al. | |
| 2006/0155183 A1 * | 7/2006 | Kroecker et al. | 600/391 |
| 2007/0006494 A1 * | 1/2007 | Hayes et al. | 40/301 |
| 2008/0306759 A1 * | 12/2008 | Ilkin et al. | 705/2 |
| 2009/0027168 A1 * | 1/2009 | Tuttle | 340/10.2 |
| 2010/0079286 A1 * | 4/2010 | Phaneuf | 340/572.1 |
| 2010/0102925 A1 * | 4/2010 | Liu et al. | 340/5.1 |

OTHER PUBLICATIONS

Finkenzeller, Klaus, "Fundamental Operating Principles", RFID Handbook: Fundamentals and Applications in Contactless Smart Cards and Identification, 2003, pp. 29-59, Chapter 3, John Wiley & Sons, Ltd., ISBN: 0-470-84402-7.
PCT Search Report dated Apr. 20, 2011 of Patent Application No. PCT/US2010/047789 filed Sep. 3, 2010.

* cited by examiner

*Primary Examiner* — Michael G Lee
*Assistant Examiner* — Laura Gudorf
(74) *Attorney, Agent, or Firm* — Vern Maine & Associates

(57) ABSTRACT

A flexible antenna capacitively coupled to related circuitry components for an active wearable data transceiver electronic location and identification device. Wearable data transceivers (WDXs) are employed as bracelets, badges, and may be incorporated with back pack straps and clothing at locations such as collars, cuffs, and hems. They employ various colors. Active transceiver communication devices are also mounted on objects for real time location tracking and identification. Body-mounted WDXs match the body with the antenna for sending and receiving signals. WDX power includes coplanar battery cells and circuitry has radio transmitter and radio receiver components.

25 Claims, 15 Drawing Sheets

RECEIVE / TRANSMIT METHOD

DEVICE COMPONENTS

DEVICE COMPONENT CONFIGURATION EMBODIMENTS

DEVICE COMPONENT LAYERS

DEVICE ACTIVATION / DEACTIVATION

FUNCTIONAL BLOCK DIAGRAM

EQUIVALENT CIRCUIT DIAGRAM

MATCHING CIRCUIT DIAGRAM

DEVICE BODY PLACEMENT

DEVICE OPERATION IN SYSTEM

WEARABLE DATA TRANSCEIVER WITH COUPLED ANTENNA

FIELD OF THE INVENTION

The invention relates to flexible antenna coupling to related electronic components, and more particularly, to a capacitively coupled flexible antenna system employed in an active wireless data transceiver (WDX) device and method.

BACKGROUND OF THE INVENTION

Many applications incorporate radio frequency identification (RFID) tags. RFID tags employ reflected energy originally transmitted from an RFID reader, and do not generate RF energy. Some Real Time Location Systems (RTLSs) track objects by associated RFID tags. For individuals, a badge is used for tracking in environments such as health-care facilities, warehouses, and other areas where location is important. These RFID personnel badges communicate with fixed or hand-held readers. These devices employ a combination of antennas and electronics. They provide structures to support and protect the antennas and electronics, and to mount or attach them to objects. In many applications size, shape and mechanical properties such as flexibility, are important but impeded. Bulky materials and construction add undue thickness and stiffness to devices. These devices require adequate electrical connections, mechanical support, and appropriate positioning of components such as connectors and antennas. Structures for these purposes can add complexity, thickness, inflexibility and cost to the RFID device.

Additionally, RFID systems operate over various frequencies from high-frequency (HF) through super-high-frequency (SHF). Multiple operating issues arise in these ranges. While the performance of an RFID tag operating in the HF band may be less affected by the tag's proximity to the human body, a typical worn device is approximately 10 cm in length, including the antenna. This is a small fraction of a wavelength for the lower frequencies. Antennas which are a small fraction of a wavelength in linear dimensions are very inefficient radiators and receptors. As a result, the useful operating range for the HF band can be just a few inches from the reader antenna, significantly limiting the usefulness of HF tags. RFID systems operating at higher frequencies, however, may provide longer ranges in part because the shorter wavelength is more comparable to the antenna dimensions. This dimension match improves efficiency. However, compared to the HF band, signals at these higher frequencies are much more strongly affected by obstacles and materials in the immediate environment of the antenna due to the shorter wavelengths. Furthermore, antennas operating on or adjacent to the human body will be severely detuned and possibly rendered inoperable. Thus, the usability of these antennas in identification devices with RFID capability is very limited. When on or near the surface of a human body, the reactive near fields are influenced by the human tissue and there may be an impedance mismatch between the antenna and connected circuits, resulting in poor overall efficiency. This mismatch may detune the antenna and reduce the energy radiated away from the body, further impairing performance.

Another characteristic of RFID systems is that the performance of such systems is governed by the Radar Equation (1).

$$P_r = \frac{P_t G_T A_r \sigma F^4}{(4\pi)^2 R^4} \quad (1)$$

Where $P_r$=the power returning to the receiving antenna, $P_t$=the transmitter power, $G_T$=the gain of the transmitting antenna, $A_r$=the effective aperture (area) of the receiving antenna, $\sigma$=the radar cross section or scattering coefficient of the target, F=the pattern propagation factor, and R=the range Essentially, this means that the system performance is limited by the fourth power ($1/R^4$) of the distance to the RFID tag. This is due to the fact that the RFID interrogator transmitter power needs to reflect off the RFID tag and be received by the interrogator.

The above problems with RFID systems may result in limited range, difficulty simultaneously tracking multiple proximate tags, and limited information capacity. What is needed is an economical, flexible and wearable device that efficiently communicates information in support of applications such as personnel or equipment location.

SUMMARY OF THE INVENTION

In contrast to RFID devices, the subject invention is a Wireless Data Transceiver (WDX). The WDX has, in part, a battery, RF oscillator, transmitter, receiver and antenna. The WDX generates its own RF energy. Therefore, the performance of the WDX is controlled by the square of the distance to the interrogating transceiver. Embodiments include wearable data transceiver (WDX) communication devices incorporating flexible antennas that are coupled to associated electronics. Embodiments comprise badges, wristbands or bracelets. They may be incorporated with clothing at locations such as collars, cuffs and hems and employ various colors. Frequency ranges may comprise bands of 300-347 MHz, 433 MHz, and 902-928 MHz. Standardized European bands as well as other ISM bands around 2.4 GHz and 5.8 GHz may be used in embodiments. There are also other frequency embodiments in the 7 GHz range used for ultra wide band. Other frequency bands may be used. Application environments include, but are not limited to hospitals, clinics, schools, warehouses, office building, factories, and prisons.

An embodiment provides a device for communication comprising an enclosure; a flexible antenna component; and communication circuitry for generating and receiving signals, wherein the communication circuitry is in electrical communication with the antenna component and the communication circuitry and the antenna component are within the enclosure, wherein the device is an active real time location and identification device. For further embodiments, the electrical communication with the antenna component and the communication circuitry comprises capacitive coupling of the antenna to the circuitry; and the capacitive coupling comprises an adhesive affixing the antenna component to the circuitry. In another embodiment, the device is matched to a proximate body of a wearer, whereby communication performance is enhanced. For further embodiments, the enclosure is flexible; components of the enclosure are seam welded, whereby device size is reduced; or components of the enclosure are RF seam welded. Optionally, components of the enclosure are heat seam welded. In embodiments, the circuit comprises a power source and an RF oscillator. In yet further embodiments, the device is affixed to at least one of collar, hem, backpack strap, and object; and the device is disposable. For some embodiments, assembly of the circuitry and the antenna is inserted through a slot defined by the enclosure, the slot being sealed once fastened around an appendage of a wearer. For others, the assembly of the circuitry and the antenna is inserted through a slot defined by the enclosure, and the slot is sealed prior to fastening around an appendage of a wearer. In yet others, the assembly of the circuitry and the antenna is inserted through a slot defined by the enclosure prior to seam welding components of the enclosure. Additionally for some embodiments, the communication circuitry comprises an inflexible circuit board; and it comprises at least one battery coplanar with circuit board of the communication circuitry. Another embodiment comprises clips retaining the at least one coplanar battery, whereby thickness of the device is reduced. While for others the color of the device is selectable. Another embodiment provides that the device comprises a matching network at about approximately 315 MHz matching a differential transmitter output impedance of about approximately 100 ohms.

Yet another embodiment provides a method of identifying a subject, comprising the steps of storing information in circuitry; placing the circuitry in electrical connection with an antenna component; inserting assembly of the circuitry and the antenna in an enclosure; attaching the enclosure to the subject to be associated with the stored information; and accessing the information in the circuitry. For other embodiments, the enclosure comprises means for attaching the enclosure to the subject, the enclosure further comprising means for retaining the assembly, wherein the retaining means comprises a resilient body portion defining an opening therein and a retaining lip adjacent the opening, whereby the opening may be deformed to permit insertion of the assembly into the body portion and the retaining lip assists in retaining the assembly in the body portion; the assembly retaining means are associated with the attaching means. Further embodiments provide that the identifying further comprises locating the subject by RF communication; and removing a tab activates the device.

A further embodiment is a method for operating on electromagnetic signals using a device comprising an antenna coupled to circuitry, the method comprising the steps of positioning the device proximate an individual; coupling the device to the individual by proximity; receiving a receive signal; coupling the receive signal to the antenna; receiving the receive signal by the circuitry, wherein the circuitry is coupled with the antenna; decoding the received signal by a processor; generating transmit data; generating a transmit signal by the circuitry; coupling the transmit signal to the antenna, wherein the antenna is coupled with the circuitry; transmitting the transmit signal. In another embodiment, the coupling of the circuitry with the antenna is capacitive.

The features and advantages described herein are not all-inclusive and, in particular, many additional features and advantages will be apparent to one of ordinary skill in the art in view of the drawings, specification, and claims. It should be noted that the language used in the specification has been principally selected for readability and instructional purposes, and not to limit the scope of the inventive subject matter.

BRIEF DESCRIPTION OF THE DRAWINGS

Figures are not necessarily to scale and illustrations of relative sizes, shapes and other detailed attributes of elements may be schematic rather than literal or precise.

DETAILED DESCRIPTION

Embodiments include a wearable data transceiver (WDX) in a bracelet form. They are physically dimensioned to match existing non-active bracelets. To provide for a small form-factor, seams are RF seam welded, avoiding the bulk of adhesive-joined seams. Materials employed allow the bracelet to be created in various colors. Embodiments are packaged inside two layers of vinyl creating a soft and flexible bracelet. It comprises a flexible antenna, retaining flexibility when the assembly is inserted into the bracelet. The active circuitry is built on a rigid, inflexible, printed circuit board, but is sufficiently small to not impair bracelet functionality. The assembly of circuitry and antenna components can either be inserted through a slot which is sealed once fastened around an individual's wrist, or it can be inserted prior to welding. In embodiments, the slot remains to provide for an activation pull tab. Another embodiment may have a pull tab inside the pocket of the enclosure and no external slot. Since the bracelet is made of flexible vinyl, the tab could be pulled out of position by squeezing it through the vinyl and pulling it out of position, thus enabling the device. In embodiments, the device is affixed to a wrist, ankle, neck or other part of a person, animal or object. It may be inserted inside an article of clothing such as a pant or dress hem, point of a collar, shirt cuff, waist belt, suspenders, or jacket cuff. Embodiments are disposable following a single use. For example, the wrist band can be cut off the wrist or ankle or they can be re-usable and employ rechargeable batteries for long term operation.

For embodiments, the pull tab is used with a bar coded identification number on it such that the bracelet can be scanned at check in to associate it with a hospital patient and, at the same time, pulling the tab activates the WDX device. By activating the WDX only when it is being put on the patient, battery power is saved thereby reducing the overall size of the device and extending its operational life. Batteries co-planar with the circuit board keep overall height thin, avoiding a noticeable bump. Embodiments include special battery contacts for this purpose.

The antenna is tuned for optimal performance in the presence of, or contact with, the human body. This extends battery life and increases the distance and accuracy of wearable data transceiver position determination.

FIGS. 1A-1E depict simplified diagrams of a bracelet device 100 configured in accordance with an embodiment.

Figure 1:
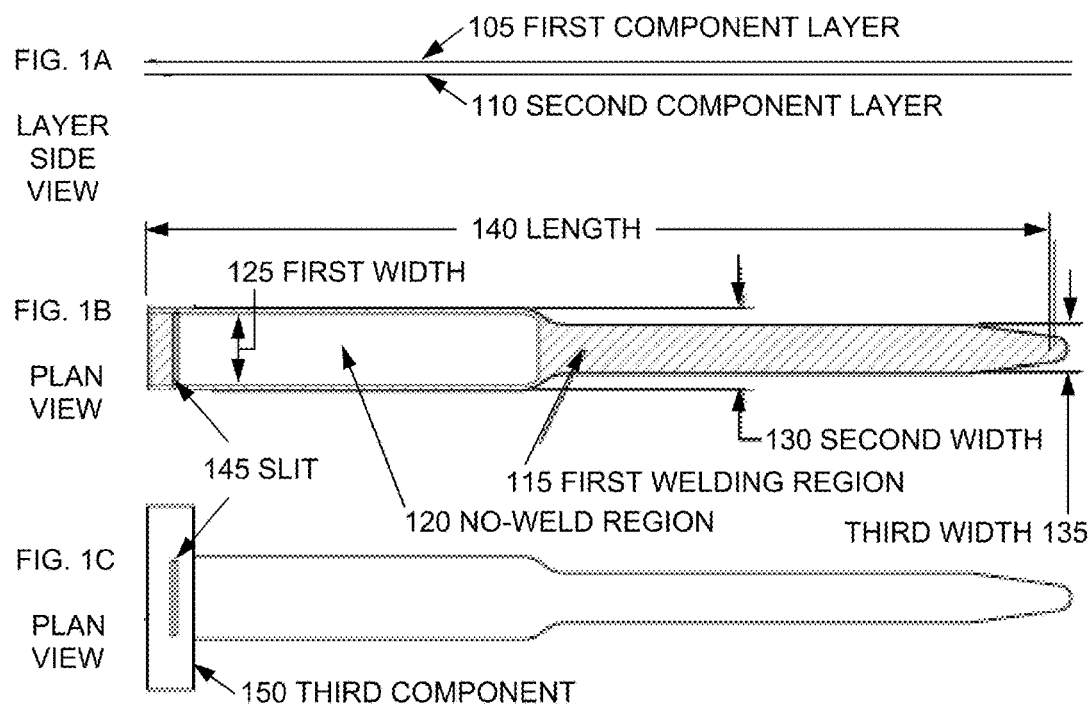
FIG. 1 is a simplified diagram of a bracelet device configured in accordance with an embodiment.
Figure 1:
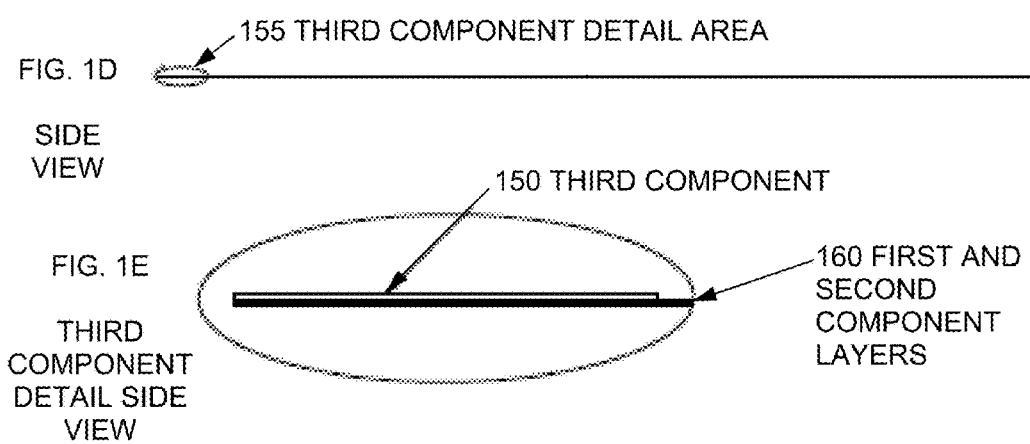

FIG. 1A is a side view of first component layer 105 and second component layer 110. For embodiments, first component layer 105 and second component layer 110 materials are vinyl. In embodiments, vinyl is 0.005" thick; however, the thickness can be changed for the particular application. A belt for a waist might be made of a material that looks like leather or may be leather. For embodiments, the thickness of the material would be adjusted to be thicker and stronger. The material could also be changed for the particular environment. For example, the WDX can be placed inside rubber gloves used to handle chemicals.

FIG. 1B shows a plan view of first and second layers attached to each other in shaded first welding region 115. In no-weld region 120, first component layer 105 and second component layer 110 are not attached, forming a pocket. Width of no-weld region, first width 125, is approximately 0.87 inch minimum. Device outside width at no-weld region 120, second width 130, is approximately 1 inch. Device width at first welding region 115, third width 135, is approximately 0.6 inch. Overall device length 140 is approximately 10.85 inches. Slit 145 is provided in first component layer 105. In embodiments, device components are inserted through slit 145.

FIG. 1C is a plan view of device 100 with third component 150 included. Embodiments of third component 150 have dimensions of about 2.2"×0.55" and comprises adhesive tape used to hold the device together once wrapped around the wrist. Other embodiments use different attachment methods.

FIG. 1D identifies device side view for area 155 shown in detail in FIG. 1E.

FIG. 1E side view depicts third component 155 proximate first and second component layers 160. For embodiments, third component 150 material is 0.002"-0.005" thick pressure sensitive adhesive (PSA). Third component 150 PSA initially has a release liner on the surface facing first component layer 105. This is removed to attach third component 150 to first and second component layers 105 and 110. Slit 145 is present in third component 150 and aligned with slit 145 in first component layer 105. In embodiments, third component 150 is adhered to first component layer 105 after welding first component layer 105 and second component layer 110. For embodiments, third component is on the slot side of the device so that the device is sealed once assembled on a wrist.

FIGS. 2A-2D show various configurations 200 of the device with respect to the batteries, circuitry, and the antenna for embodiments of the invention.

Figure 2:
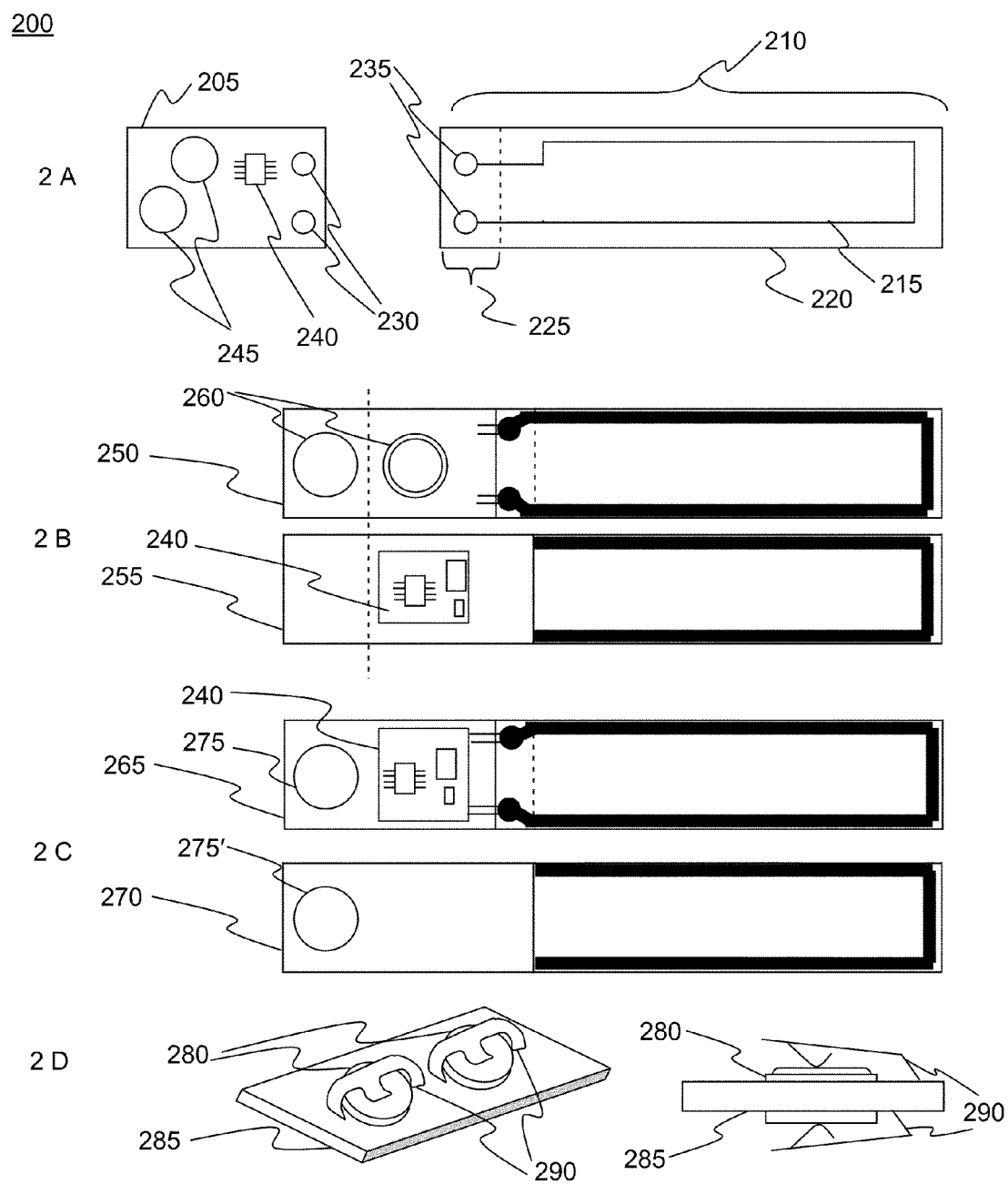
FIGS. 2A-2D are simplified diagrams of device component configurations in accordance with embodiments.

FIG. 2A depicts use of circuit board 205. Antenna component 210 comprises a conductive silver screen printed antenna element 215 over substrate 220 using, in embodiments, 3M™ very high bonding (VHB™) adhesive tape in region 225 to bond them together. A 0.002" inch (467 MP from 3M™) adhesive thickness is used for embodiments. Other embodiments use 0.005" thick VHB (468 MP from 3M™). Further embodiments use 9505 and 9502 VHB versions from 3M™. Version selection stems from the relationship of the thickness to the tuning parameters. Embodiments employ 0.005 inch thick polyester for substrate 220. Conducting components may be metals, polymers, inks, carbon, and organic material. The ohmic loss of the material is taken into account in the design to avoid unnecessary losses. The figure also shows the use of conductive plates 230 and 235. In embodiments, conductive plates 230 are round copper on circuit board 205, and conductive plates 235 are conductive silver ink on substrate 220. Plates 230 and 235 function as the plates of a capacitor, coupling antenna and circuitry components. In one embodiment, the diameter of plates is 0.25-inch, and they are separated by 0.005-inch of adhesive dielectric. Conductive plates 230 and 235 are aligned over each other, with circuit components 240 and power source 245 laterally opposite antenna component 210. Circuit components and batteries are outside of regions 225 and 230 when assembled. The artisan will appreciate that conductive plates 230 and 235 may be shapes other than circular, and that minor misalignments of the plates will not appreciably affect the operation. Assembled length in embodiments is approximately 4 inches. In embodiments, circuit board material is Flame Retardant 4 (FR4) and thickness is 0.015 inch. Attributes include compliance with Underwriters Laboratories UL 94-V0 flammability standard. Dielectric constant properties include values of 4.7 maximum with 4.35 at 500 MHz, and 4.34 at 1 GHz. In embodiments, the antenna of the subject invention is a balanced, electrically-small loop antenna. Other antennas may be implemented, and do not necessarily have to be a loop. In the case of electrically small loop antennas, it is desirable to maximize the enclosed area of the loop. The shape of the loop, in this case, is immaterial except for maximizing its enclosed area. Matching component values were determined with device components in proximity to a body.

FIG. 2B depicts a device first side 250 and second side 255 Batteries 260 are on first side 250 and circuit components 240 on second side 255. Leftmost battery of 260 may be omitted if the extra power capacity were not required.

FIG. 2C depicts a device first side 265 and second side 270. Battery 275 and circuit components 240 are on first side 265 and battery 275' is on second side 270.

FIG. 2D depicts battery 280 co-planar with the illustrated circuit board segment 285 retrained by clips 290.

Figure 3:
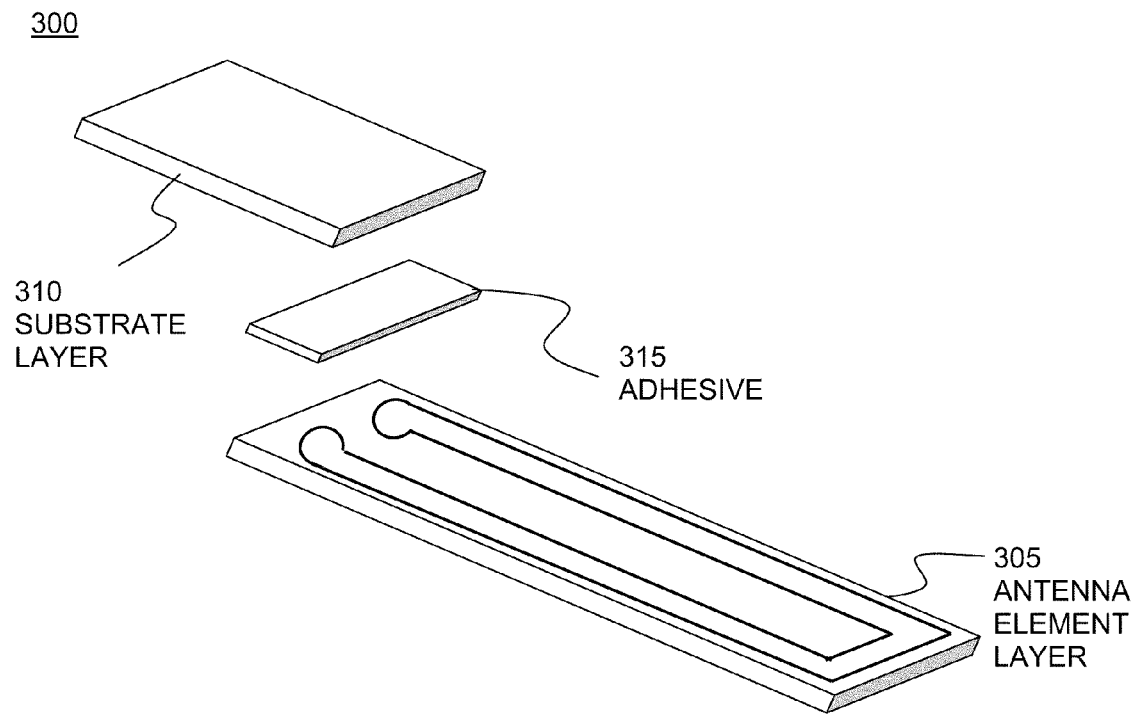
FIG. 3 is a simplified exploded diagram of device component layers in accordance with one embodiment.

FIG. 3 depicts a simplified exploded diagram 300 of device component layers. Antenna element layer 305 is affixed to substrate layer 310 by adhesive 315. For embodiments, adhesive is in coupling regions only.

Figure 4:
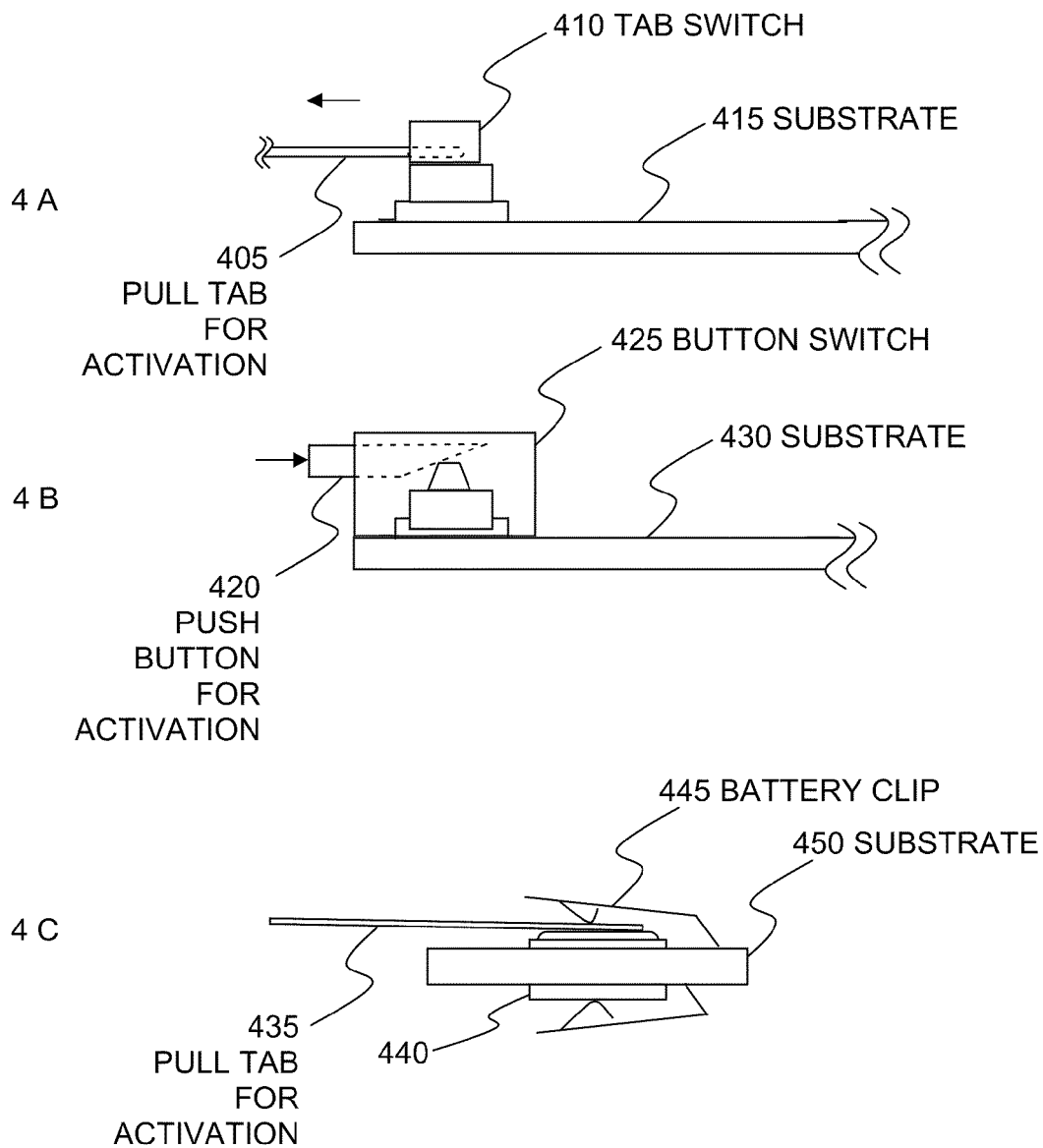
FIG. 4A-4C depict simplified views of device activation/deactivation embodiments.

FIGS. 4A-4C depict device activation and de-activation implementation embodiments 400. In FIG. 4A, pulling pull tab or strip 405 starts the system by operating tab switch 410 on substrate 415. In FIG. 4B, pushing push button 420 starts the device by operating button switch 425 on substrate 430. In FIG. 4C, pulling tab 435 starts the system by enabling electrical contact between battery 440 and battery clip 445. In embodiments, battery 440 is located within an aperture in substrate 450. For other embodiments, the device is activated by external force on the flexible enclosure, closing a circuit. For embodiments, cutting disables the device. Cutting the bracelet off at the antenna is sufficient in embodiments to stop transmissions and uses a task already employed for removing the device. For some embodiments it is not required that the device be turned off; for some embodiments the batteries will run out in a short time.

Figure 5:
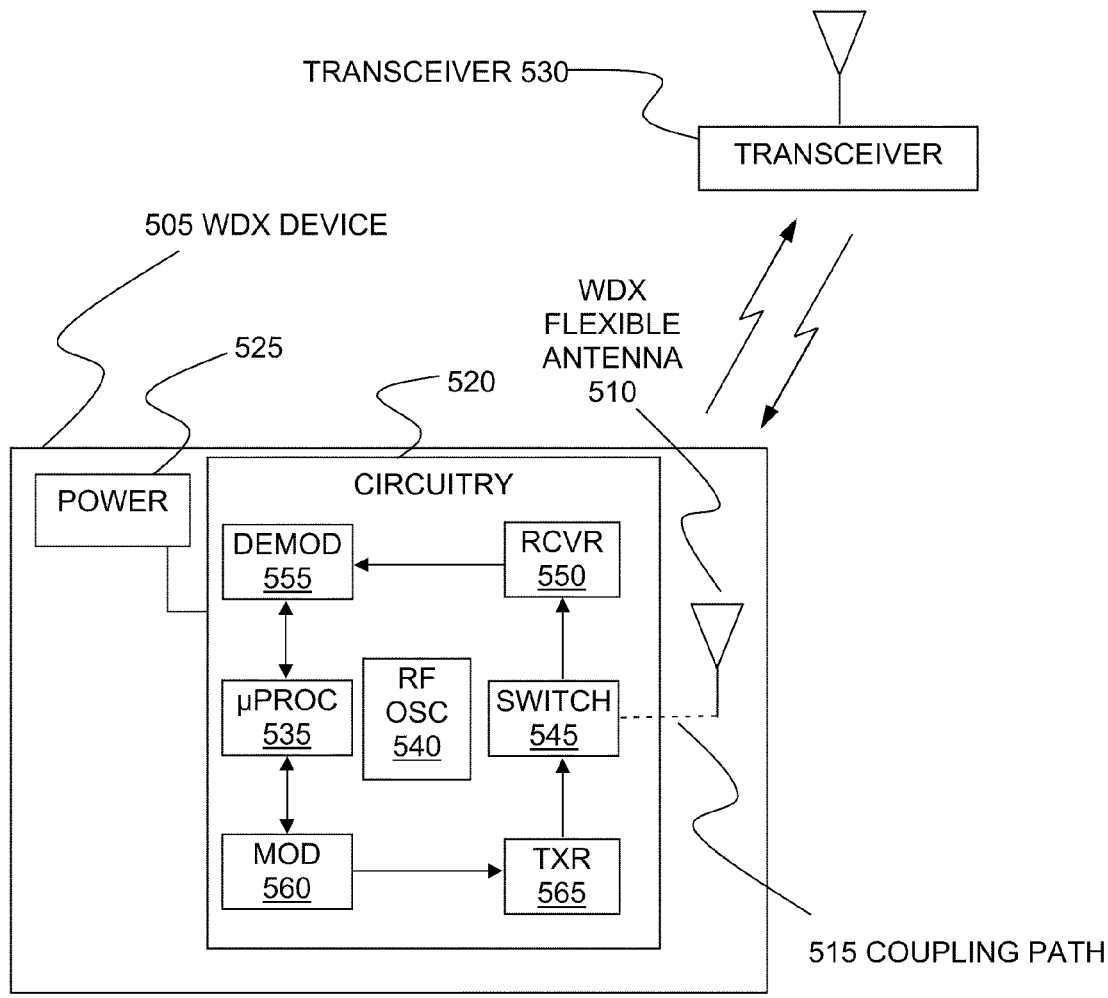
FIG. 5 is a simplified diagram of a functional schematic in accordance with one embodiment.

FIG. 5 is a simplified diagram 500 of a functional schematic of a WDX device 505. Flexible antenna 510 is coupled 515 to circuitry 520. Coupling embodiments are capacitive. Circuitry 520 operates from power source 525 incorporated in WDX device 505. WDX device 505 communicates with transceiver 530 to exchange data and establish WDX device 505 location. In embodiments, circuitry 520 components comprise microprocessor 535, radio frequency (RF) oscillator 540, switch 545, RF receiver 550, RF demodulator 555, RF modulator 560, and RF transmitter 565. Each embodiment comprises a power supply and RF oscillator. Note that RF oscillator component 540 generates the RF signal for RF signal transmission, distinct from an integrated circuit clock-generating oscillator. Components may be contained within other components. Components of other various embodiments (not shown) comprise analog to digital converter (ADC), digital to analog converter (DAC), and memory. Integrated circuit component form-factors include, but are not limited to, small-outline integrated circuit (SOIC) and chip on board with an epoxy encapsulant (glob top).

Figure 6A:
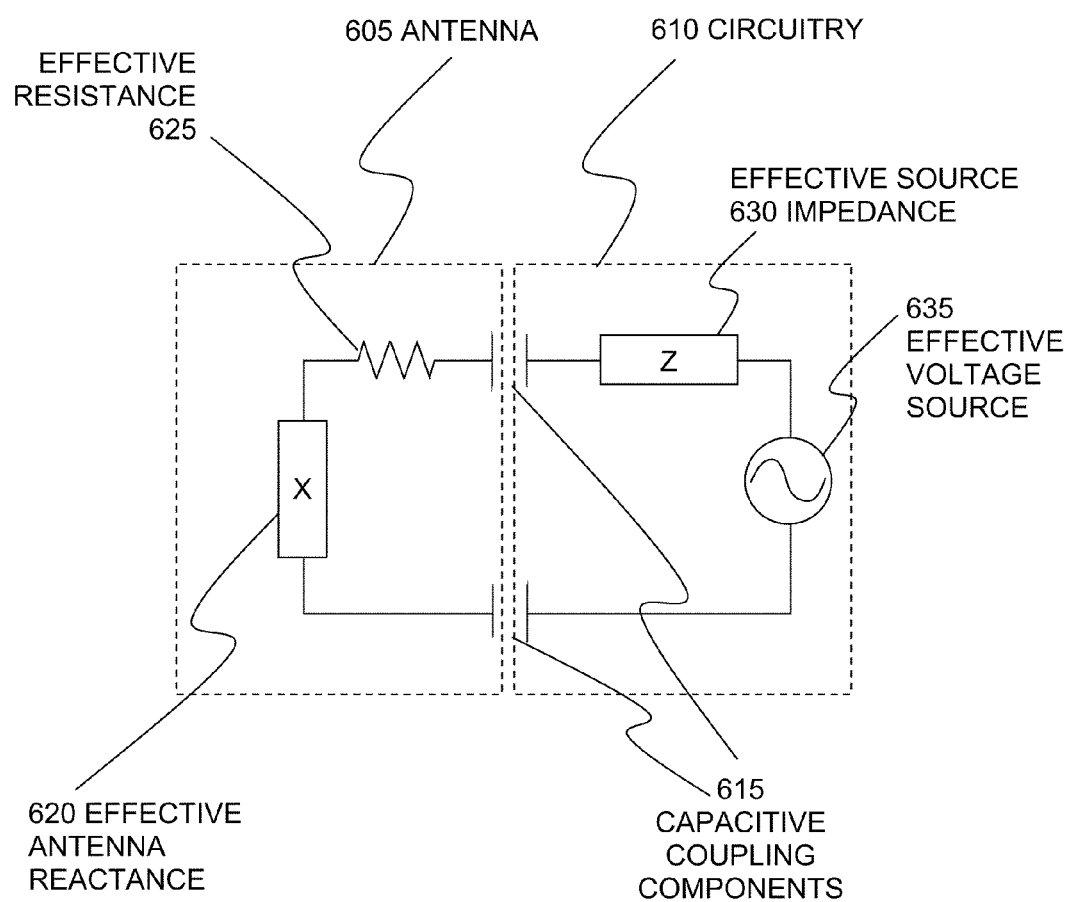
FIGS. 6A and 6B depict equivalent and matching circuits for device components in accordance with one embodiment.
Figure 6B:
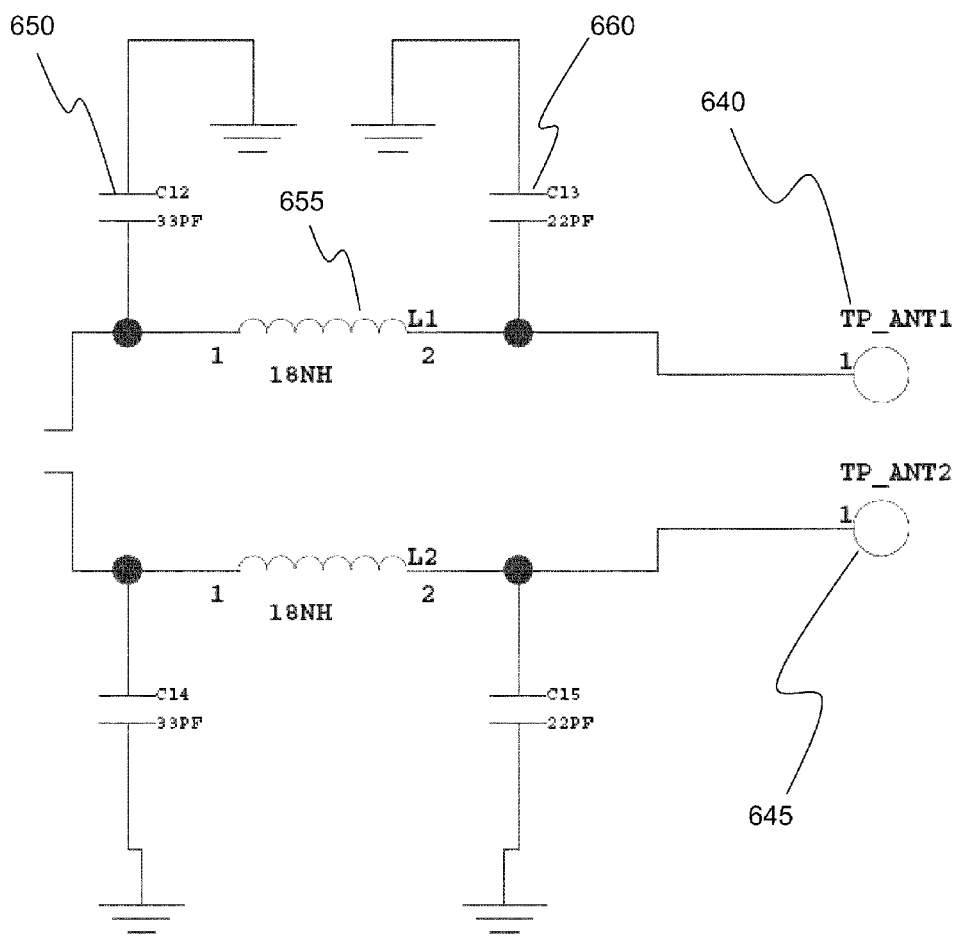

FIGS. 6A and 6B depict equivalent and matching circuits, respectively, for device embodiments.

FIG. 6A depicts an equivalent circuit 600A for a WDX device with antenna component 605 and circuitry component 610. In embodiments, antenna component 605 and circuitry component 610 are capacitively coupled by components 615. Antenna component 605 can be modeled as reactance 620 in series with resistor 625. Reactance 620 represents the reactance of the antenna. Resistor 625 represents power dissipation through the losses in the antenna and in the coupled dielectric plus the radiated energy. Circuitry component 615 comprises effective source impedance 630 and effective voltage source 635 from the circuitry.

FIG. 6B depicts a matching circuit 600B for a WDX device. TP_ANT1 640 and TP_ANT2 645 are the pads on the printed circuit board (PCB) which interface with the flexible antenna. The components are mirrored since the output of the transmitter (on the left side, not labeled) is a differential, balanced output; thus, only one side is described. C12 650 of 33 pF, L1 655 of 18 nH and C13 660 of 22 pF form a "pi" network which serves two purposes. First, it matches the impedance of the antenna at points TP_ANT1 640 and TP_ANT2 645 to the transmitter output which is approximately a 100-ohm differential impedance. Secondly, it forms a low-pass filter with a cutoff frequency slightly above the intended band of operation. This filter action helps insure compliance with FCC requirements for harmonic suppression. The values shown are representative and specific to the embodiment application in the 315 MHz band. Changes in at least any of the following conditions would require different values: different operating frequency, different antenna size or shape, optimization for other than a bracelet.

Figure 7:
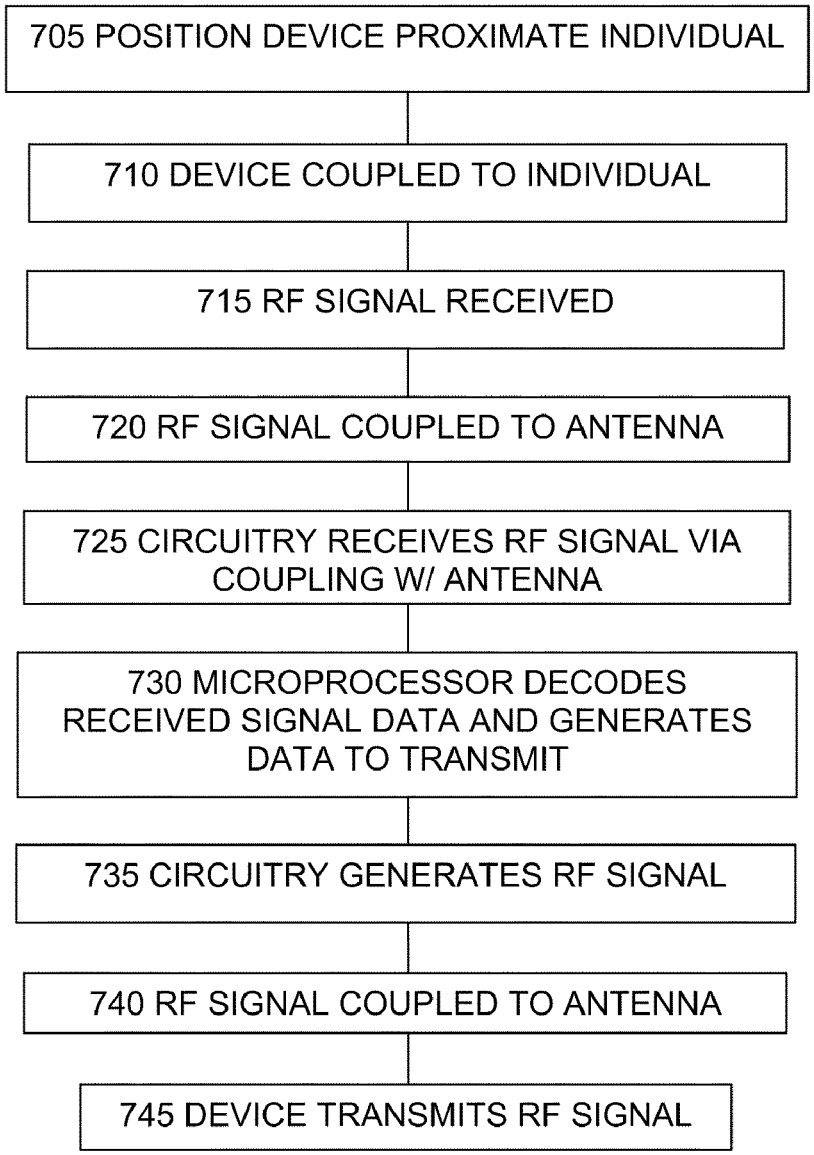
FIG. 7 is a flow chart of a method of operation in accordance with one embodiment.

FIG. 7 is a flow chart 700 of a method of operation of an embodiment of the WDX device. The steps include positioning the device proximate an individual, 705. Coupling the device to an individual by proximity, 710. Receiving an RF signal, 715 comprising RF signal coupled to the antenna, 720. Circuitry receives the RF signal via coupling with the antenna, 725. Microprocessor decodes received signal data and generates data to transmit, 730. The circuitry generates an RF signal, 735. The RF signal is coupled to the antenna, 740. The device transmits the RF signal, 745. Note that the steps may be performed in alternate orders.

Figure 8:
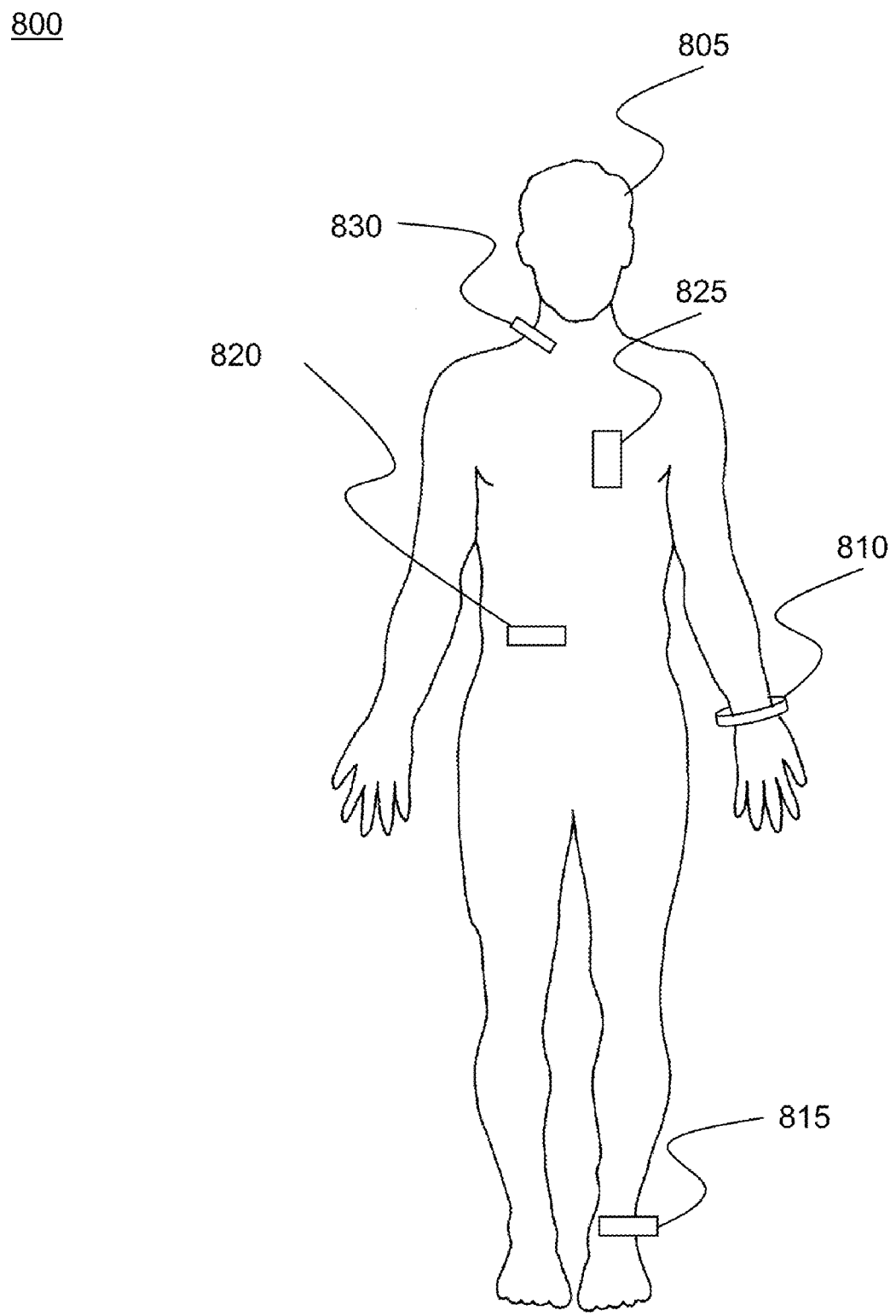
FIG. 8 is a simplified diagram of device body placement components in accordance with one embodiment.

FIG. 8 depicts particular, but not exhaustive, body locations 800 for the WDX device. Body 805 locations for device mounting include wrist 810, garment hem 815, waist 820, chest 825, and collar 830. Nonlimiting embodiment locations include sleeve cuffs, belts, gloves, shoes, and an embodiment that attaches to the skin like an adhesive strip.

Figure 9:
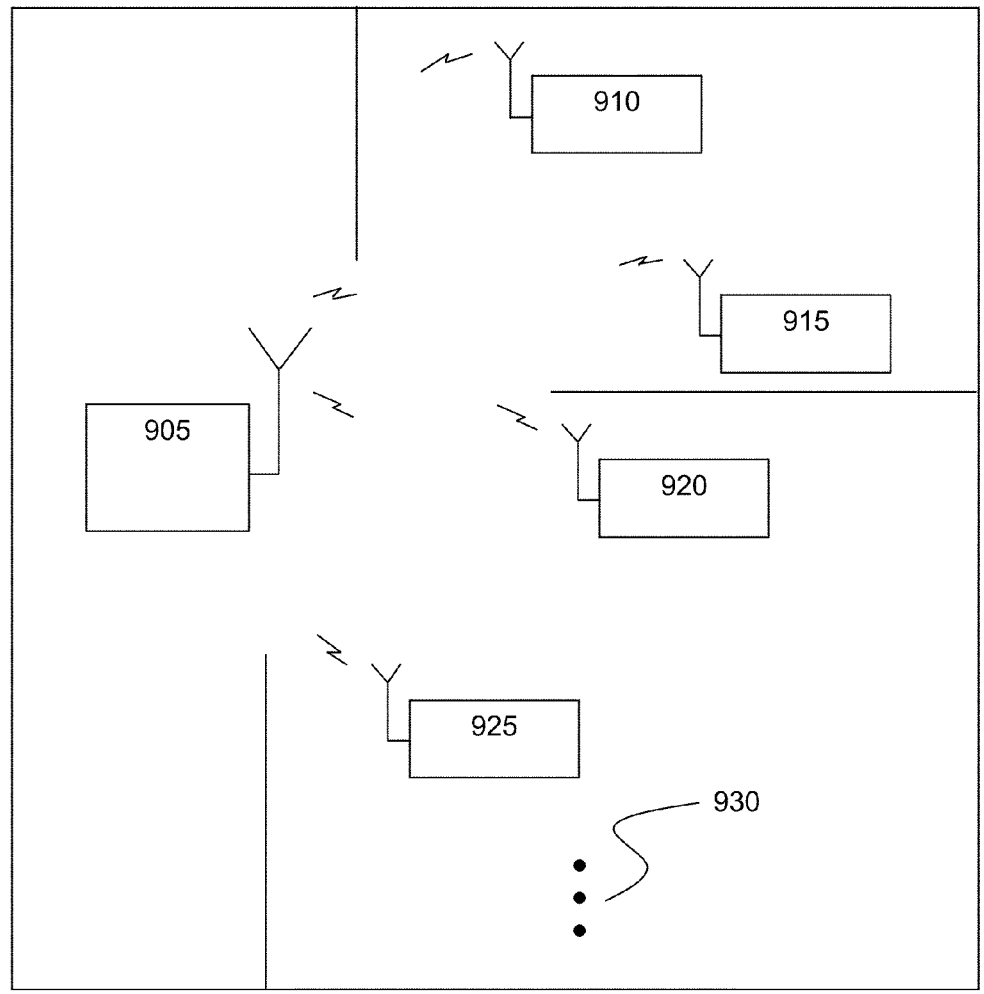
FIG. 9 is a simplified diagram of an operational system configuration in accordance with one embodiment.

FIG. 9 is a simplified diagram 900 of an operational system configuration embodiment. Transceiver 905 is in communication with multiple WDX devices, in this case within a building. WDX devices 910, 915, 920, and 925 communicate with transceiver 905. Additional WDX devices 930 may be operational within the facility building. In embodiments, the transceiver 905 antenna is circularly polarized to support a wearable data transceiver antenna of random linear polarization. This would avoid polarization fades.

FIGS. 10 A-E are detailed scale illustrations of a wrist band system embodiment depicting circuitry and antenna components and their insertion into a wrist band enclosure.

Figure 10A:
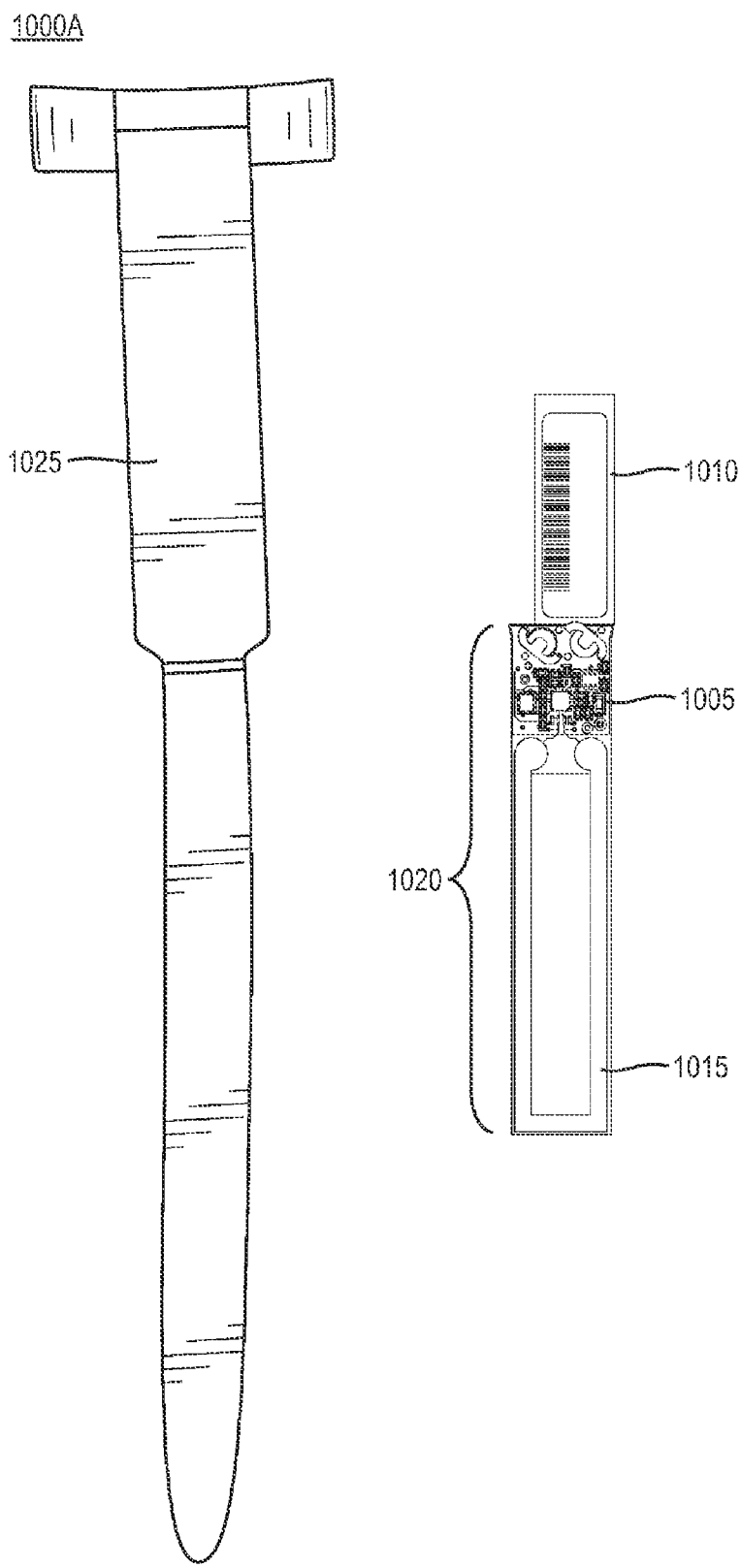
FIGS. 10 A-E are detailed illustrations of a wrist band system in accordance with one embodiment.

FIG. 10A is a detailed illustration 1000A of circuitry 1005 with pull tab 1010 and antenna 1015 components comprising assembly 1020 beside wrist band enclosure 1025.

Figure 10B:
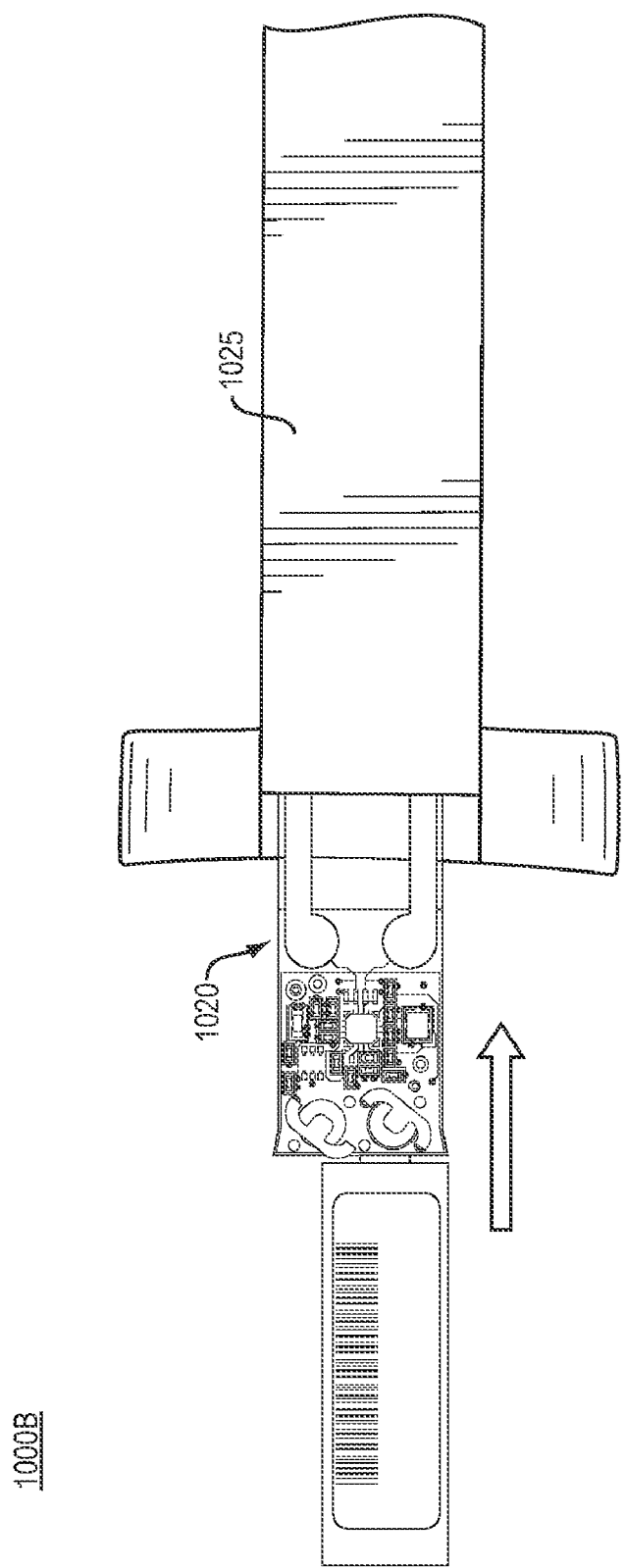

FIG. 10B is a detailed illustration 1000B of assembly 1020 partially inserted into wrist band enclosure 1025.

Figure 10C:
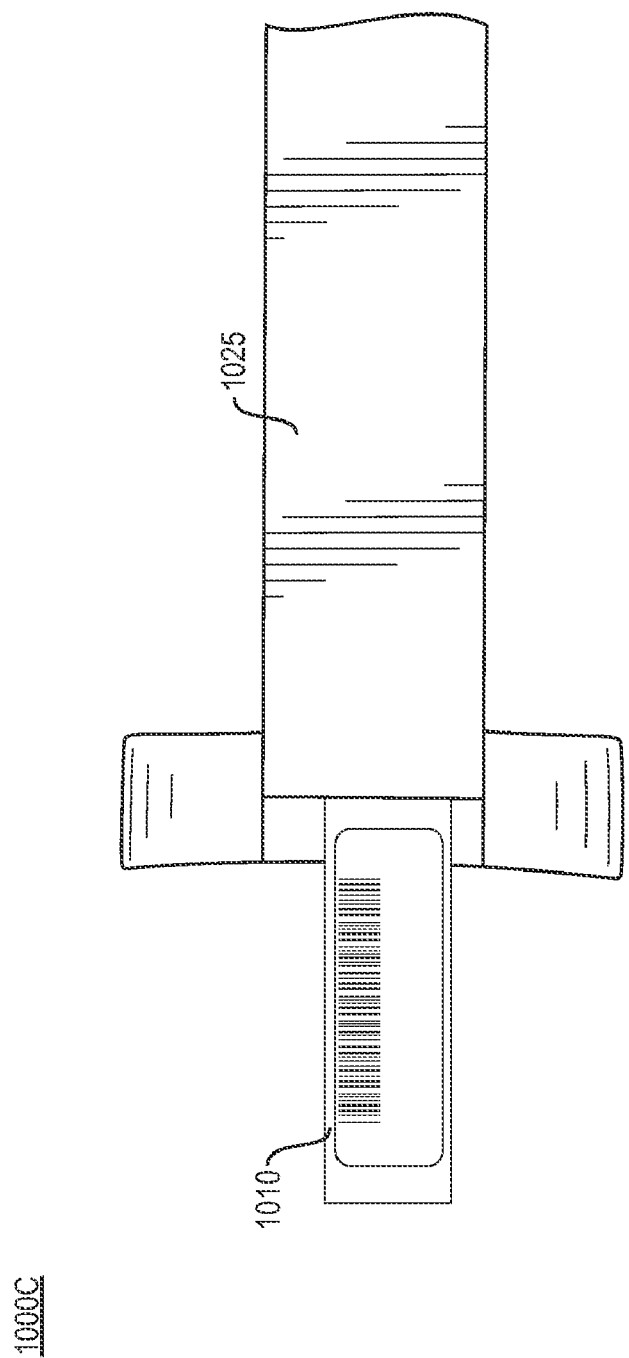

FIG. 10C is a detailed illustration 1000C of assembly 1020 (not visible) within wrist band enclosure 1025 depicting pull tab 1010.

Figure 10D:
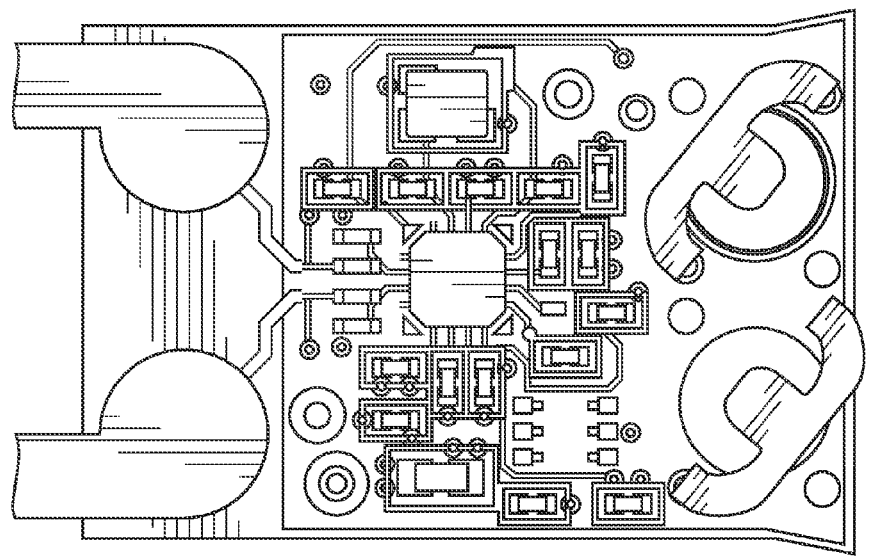

FIG. 10D is a detailed scale illustration 1000D of top or front of circuitry component.

Figure 10E:
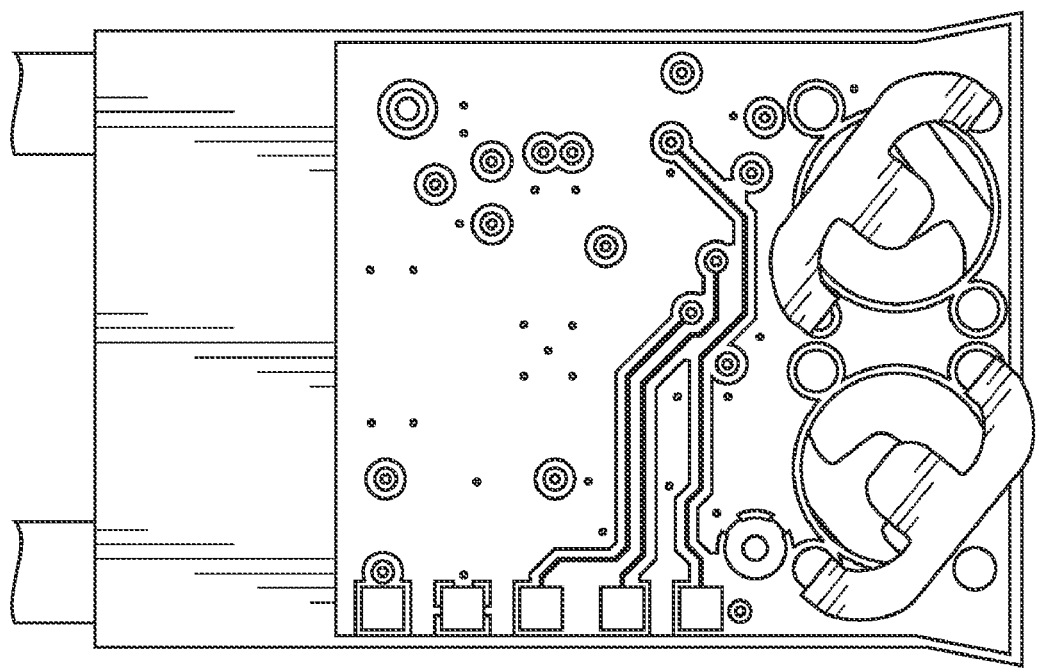

FIG. 10E is a detailed scale illustration 1000E of bottom or back of circuitry component.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A wireless data transceiver device (WDX) for communication comprising:
   an enclosure;
   a flexible antenna component;
   communication circuitry for generating and receiving signals, wherein said communication circuitry is in electrical communication with said antenna component and said communication circuitry and said antenna component are within said enclosure, wherein said wireless data transceiver device is an active real time location and identification device;
   said WDX communicates with a remote device through radio frequency wave transmission; and
   said WDX comprising an active transmitter, said WDX both initiating communication with and responding to received signals of said remote transceiver;
   wherein said device is matched to a proximate body of a wearer, said matching comprising:
   reactive near-field interaction between said proximate body and said device;
   whereby overall efficiency is improved and communication performance is enhanced.

2. The device of claim 1, wherein said electrical communication with said flexible antenna component and said communication circuitry comprises capacitive coupling of said antenna to said circuitry, whereby reliability of operation of said WDX is achieved through flexure of said flexible antenna.

3. The device of claim 2, wherein said capacitive coupling comprises an adhesive affixing said antenna component to said circuitry, wherein said adhesive is about 0.005 inch thick and sandwiched between conductive plates of about 0.25 inch in extent.

4. The device of claim 1, wherein said matching network is a differential matching network comprising:
   two symmetric branches, each said branch comprising a first capacitor, an inductor, and a second capacitor;
   said inductor having a first lead and a second lead;
   said first inductor lead is electrically coupled to a circuitry connection and a first lead of said first capacitor;
   said second inductor lead is electrically coupled to an antenna connection and a first lead of said second capacitor;
   a second lead of said first capacitor is coupled to a first ground; and
   a second lead of said second capacitor is coupled to a second ground;
   whereby said differential matching network matches impedance of said antenna at said antenna leads to output of said device's transmitter and said differential matching network forms a low-pass filter having a cutoff frequency above band of operation of said device whereby harmonics are suppressed.

5. The device of claim 4, wherein said first capacitor value is about 33 picofarads (pF);
said second capacitor value is about 22 picofarads (pF); and
said inductor value is about 18 nanohenries (nH).

6. The device of claim 1, wherein components of said enclosure are heat seam welded or RF seam welded.

7. The device of claim 1, wherein said device is affixed to at least one of collar, hem, backpack strap, and object.

8. The device of claim 1, wherein assembly of said circuitry and said antenna is inserted through a slot defined by said enclosure, said slot being sealed once fastened around an appendage of a wearer.

9. The device of claim 1, wherein assembly of said circuitry and said antenna is inserted through a slot defined by said enclosure, and said slot is sealed prior to fastening around an appendage of a wearer.

10. The device of claim 1, wherein assembly of said circuitry and said antenna is inserted through a slot defined by said enclosure prior to seam welding components of said enclosure.

11. A wireless data transceiver device (WDX) for communication comprising:
an enclosure;
a flexible antenna component;
communication circuitry for generating and receiving signals, wherein said communication circuitry is in electrical communication with said antenna component and said communication circuitry and said antenna component are within said enclosure, wherein said wireless data transceiver device is an active real time location and identification device;
said WDX communicates with a remote device through radio frequency wave transmission; and
said WDX comprising an active transmitter, said WDX both initiating communication with and responding to received signals of said remote transceiver;
whereby power returning to a receiving antenna of said remote device from said WDX is diminished proportionate to a second power of range distance between said remote device and said WDX ($1/R^2$).

12. The device of claim 11, wherein said circuit comprises a power source and an RF oscillator, wherein said RF oscillator is powered by and excited by said power source and said communication circuitry.

13. The device of claim 11, wherein said device is disposable.

14. The device of claim 11, wherein said communication circuitry comprises an inflexible circuit board.

15. The device of claim 11, wherein said device operates in at least one frequency band of frequency bands of 285 MHz to 399.8 MHz, 410 MHz to 607.9 MHz, and 800 MHz to 928 MHz.

16. A wireless data transceiver device (WDX) for communication comprising:
an enclosure;
a flexible antenna component;
communication circuitry for generating and receiving signals, wherein said communication circuitry is in electrical communication with said antenna component and said communication circuitry and said antenna component are within said enclosure, wherein said wireless data transceiver device is an active real time location and identification device;
said WDX communicates with a remote device through radio frequency wave transmission; and
said WDX comprising an active transmitter, said WDX both initiating communication with and responding to received signals of said remote transceiver;
said device comprising at least one battery coplanar with a circuit board of said communication circuitry, said coplanar battery located within said circuit board, said battery circumscribed by an opening defined by said circuit board.

17. The device of claim 16, comprising clips retaining said at least one coplanar battery, wherein each of said clips comprises an arcuate segment;
said arcuate segment anchored at each extremity to a circuit board by an angled flexible leg located approximately along an extended diagonal of said battery;
said arcuate segment including a flexible-spring curved prong at approximately the center of inside curve of said arcuate segment, said prong providing said retaining force on said battery, whereby thickness of said device is reduced, moving components are eliminated, and installation and removal of said battery is accomplished without opening a battery enclosure.

18. The device of claim 16, wherein said device comprises a matching network at frequencies between 300 MHz and 347 MHz matching a differential transmitter output impedance of about 100 ohms.

19. A wireless data transceiver device (WDX) for communication comprising:
an enclosure;
a flexible antenna component;
communication circuitry for generating and receiving signals, wherein said communication circuitry is in electrical communication with said antenna component and said communication circuitry and said antenna component are within said enclosure, wherein said wireless data transceiver device is an active real time location and identification device;
said WDX communicates with a remote device through radio frequency wave transmission; and
said WDX comprising an active transmitter, said WDX both initiating communication with and responding to received signals of said remote transceiver;
wherein said flexible antenna comprises a single rectangular loop;
said communication circuitry comprises:
a power source to power said communication circuitry;
a power switch electrically connected between said power source and said communication circuitry; whereby said device is electrically unpowered and inoperative until said switch is activated from a normal open circuit setting to a closed circuit setting;
an RF oscillator providing an RF source, distinct from an integrated circuit clock-generating oscillator;
an RF signal switch in RF communication with said flexible antenna;
an RF receiver in RF communication with said RF signal switch;
an RF demodulator in communication with said RF receiver;
a microprocessor in communication with said RF demodulator;
an RF modulator in communication with said microprocessor; and
an RF transmitter in RF communication with said RF modulator;
wherein said RF transmitter is in RF communication with said RF signal switch.

20. A method of locating and identifying a subject with a wireless data transceiver (WDX), comprising the steps of:

storing information in circuitry of said WDX;
placing said circuitry in electrical connection with an antenna component of said WDX;
inserting assembly of said circuitry and said antenna in an enclosure of said WDX;
attaching said enclosure to said subject to be associated with said stored information; and
accessing said information in said circuitry;
wherein said WDX circuitry and said WDX antenna comprise an active real time location and identification device, said WDX having an active transmitter, and said WDX both initiating communication with and responding to received signals of a remote transceiver;
wherein removing a tab activates said device; said tab activation comprising:
 changing setting of a power switch electrically connected between a power supply of said device and said circuitry of said device, whereby said device is electrically unpowered and inoperative until said switch is activated from a normal open circuit setting to a closed circuit setting by said activation.

21. The method of claim 20, wherein said enclosure comprises means for attaching said enclosure to said subject, said enclosure further comprising means for retaining said assembly, wherein said retaining means comprises a resilient body portion defining an opening therein and a retaining lip adjacent said opening, whereby said opening may be deformed to permit insertion of said assembly into said body portion and said retaining lip assists in retaining said assembly in said body portion; said assembly retaining means are associated with said attaching means.

22. The method of claim 20, wherein said identifying comprises locating said subject by RF communication within a structure.

23. The method of claim 20, wherein said coupling of said circuitry with said antenna is capacitive.

24. A method for operating on electromagnetic signals using a wireless data transceiver device comprising an antenna coupled to circuitry, said method comprising the steps of:
positioning said wireless data transceiver device proximate an individual;
coupling said wireless data transceiver device to said individual by proximity;
wherein said wireless data transceiver device is matched to body of said proximate individual, said matching comprising reactive near-field interaction between said proximate body and said wireless data transceiver device, whereby overall efficiency is improved and communication performance is enhanced;
receiving a receive signal at said wireless data transceiver device;
coupling said receive signal to said antenna of said wireless data transceiver device;
receiving said receive signal by said circuitry of said wireless data transceiver device, wherein said circuitry is coupled with said antenna;
decoding said received signal by a processor of said wireless data transceiver device;
generating transmit data;
generating a transmit signal by said circuitry of said wireless data transceiver device;
coupling said transmit signal to said antenna, wherein said antenna is coupled with said circuitry; and
transmitting said transmit signal;
wherein said wireless data transceiver device both initiates communication with and responds to received signals of a remote transceiver, and said wireless data transceiver device is an active real time location and identification device.

25. The method of claim 24, wherein said method comprises operating in at least one frequency band of frequency bands of 285 MHz to 399.8 MHz, 410 MHz to 607.9 MHz, and 800 MHz to 928 MHz.

* * * * *